(12) United States Patent
Al-Hazmi et al.

(10) Patent No.: US 10,099,210 B2
(45) Date of Patent: Oct. 16, 2018

(54) CATALYTIC METHODS FOR CONVERTING NAPHTHA INTO OLEFINS

(71) Applicant: SAUDI BASIC INDUSTRIES CORPORATION, Riyadh (SA)

(72) Inventors: Mohammed Al-Hazmi, Riyadh (SA); Taiwo A. Odedairo, Riyadh (SA); Ahmed Al-Zenaidi, Riyadh (SA); Sulaiman Al-Khattaf, Dhahran (SA); Nabil Al-Yassir, Dhahran (SA); Abdullah Aitani, Dhahran (SA); M. Abdulbari Siddiqui, Dhahran (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/784,396

(22) PCT Filed: Apr. 28, 2014

(86) PCT No.: PCT/IB2014/061049
§ 371 (c)(1),
(2) Date: Oct. 14, 2015

(87) PCT Pub. No.: WO2014/177988
PCT Pub. Date: Nov. 6, 2014

(65) Prior Publication Data
US 2016/0074847 A1    Mar. 17, 2016

Related U.S. Application Data

(60) Provisional application No. 61/816,999, filed on Apr. 29, 2013.

(51) Int. Cl.
| | | |
|---|---|---|
| *B01J 29/06* | (2006.01) | |
| *B01J 29/40* | (2006.01) | |
| *B01J 37/00* | (2006.01) | |
| *B01J 37/30* | (2006.01) | |
| *B01J 29/076* | (2006.01) | |
| *B01J 29/48* | (2006.01) | |
| *B01J 37/02* | (2006.01) | |
| *C10G 11/05* | (2006.01) | |

(52) U.S. Cl.
CPC .......... *B01J 29/405* (2013.01); *B01J 29/061* (2013.01); *B01J 29/076* (2013.01); *B01J 29/40* (2013.01); *B01J 29/48* (2013.01); *B01J 37/0009* (2013.01); *B01J 37/0201* (2013.01); *B01J 37/0203* (2013.01); *B01J 37/30* (2013.01); *C10G 11/05* (2013.01); *B01J 2229/18* (2013.01); *B01J 2229/186* (2013.01); *B01J 2229/42* (2013.01); *C10G 2300/1044* (2013.01); *C10G 2300/1092* (2013.01)

(58) Field of Classification Search
CPC . B01J 29/40; B01J 29/405; B01J 29/48; B01J 37/0201; B01J 37/0203; B01J 37/0009; B01J 37/30; B01J 2229/18; B01J 2229/186; B01J 2229/42; C10G 2300/1044; C10G 2300/1092; C10G 11/05
USPC .......... 502/60, 63, 64, 71, 77; 208/113, 121, 208/136
See application file for complete search history.

(56) References Cited

U.S. PATENT DOCUMENTS

| | | | | |
|---|---|---|---|---|
| 4,950,829 A | * | 8/1990 | Han | B01J 29/40 502/77 |
| 5,308,813 A | * | 5/1994 | Vaughan | B01J 29/04 502/208 |
| 5,628,978 A | | 5/1997 | Tejada et al. | |
| 5,670,037 A | | 9/1997 | Zaiting et al. | |
| 6,033,555 A | | 3/2000 | Chen et al. | |
| 6,069,287 A | | 5/2000 | Ladwig et al. | |
| 6,080,303 A | | 6/2000 | Cao et al. | |
| 6,080,697 A | | 6/2000 | Zhang et al. | |
| 6,087,514 A | * | 7/2000 | Thangaraj | B01J 29/89 423/713 |
| 6,090,271 A | | 7/2000 | Carpency et al. | |
| 6,180,550 B1 | * | 1/2001 | Beck | B01J 29/04 502/60 |
| 6,211,104 B1 | | 4/2001 | Shi et al. | |
| 6,288,298 B1 | | 9/2001 | Rodriguez et al. | |
| 6,300,535 B1 | | 10/2001 | Van Den Berge et al. | |
| 6,300,537 B1 | | 10/2001 | Strohmaier et al. | |
| 6,307,117 B1 | | 10/2001 | Tsunoda et al. | |
| 6,339,181 B1 | | 1/2002 | Chen et al. | |
| 6,388,161 B1 | | 5/2002 | Dath et al. | |
| 6,521,563 B2 | | 2/2003 | Strohmaier et al. | |

(Continued)

FOREIGN PATENT DOCUMENTS

| | | |
|---|---|---|
| CN | 101327443 A | 12/2008 |
| CN | 102114429 A | 7/2011 |

(Continued)

OTHER PUBLICATIONS

Xu et al., Incorporation of Titanium into H-ZSM-5 Zeolite via Chemical Vapor Deposition: Effect of Steam Treatment, Korean Chem. Soc. 2004, vol. 25, No. 5, pp. 681-686.*

(Continued)

*Primary Examiner* — Elizabeth D Wood
(74) *Attorney, Agent, or Firm* — Cantor Colburn LLP

(57) ABSTRACT

The inventions described herein relate to catalysts comprising a zeolite comprising at least one metal or ion thereof, wherein the at least one metal or ion thereof comprises barium, strontium, titanium, tungsten, or a mixture thereof, and wherein the zeolite does not comprise molybdenum, or phosphorus, and methods related thereto.

20 Claims, No Drawings

(56) References Cited

U.S. PATENT DOCUMENTS

| | | |
|---|---|---|
| 6,548,725 B2 | 4/2003 | Froment et al. |
| 6,646,175 B1 | 11/2003 | Dath et al. |
| 6,652,737 B2 | 11/2003 | Touvelle et al. |
| 6,656,345 B1 | 12/2003 | Chen et al. |
| 6,696,614 B2 | 2/2004 | Pollesel et al. |
| 6,791,002 B1 | 9/2004 | Abrevaya et al. |
| 6,835,863 B2 | 12/2004 | Chester et al. |
| 6,867,341 B1 | 3/2005 | Abrevaya et al. |
| 6,951,968 B1 | 10/2005 | Dath et al. |
| 7,026,263 B2 | 4/2006 | Le Van Mao |
| 7,098,162 B2 | 8/2006 | Le Van Mao |
| 7,135,602 B1 | 11/2006 | Le Van Mao |
| 7,261,807 B2 | 8/2007 | Henry et al. |
| 7,301,063 B2 | 11/2007 | Choi et al. |
| 7,314,964 B2 | 1/2008 | Abrevaya et al. |
| 7,326,332 B2 | 2/2008 | Chen et al. |
| 7,384,863 B2 | 6/2008 | Shibata |
| 7,446,071 B2 | 11/2008 | Abrevaya et al. |
| 7,456,128 B2 | 11/2008 | Mao |
| 7,459,596 B1 | 12/2008 | Abrevaya et al. |
| 7,488,800 B2 | 2/2009 | Liang et al. |
| 7,531,706 B2 | 5/2009 | Wakui et al. |
| 7,585,489 B2 | 9/2009 | Abrevaya et al. |
| 7,615,143 B2 | 11/2009 | Chen et al. |
| 7,663,013 B2 | 2/2010 | Choi et al. |
| 7,686,742 B2 | 3/2010 | Tischler et al. |
| 7,718,840 B2 | 5/2010 | Choi et al. |
| 7,863,212 B2 | 1/2011 | Wakui |
| 9,056,308 B2 | 6/2015 | Choo et al. |
| 2001/0053868 A1 | 12/2001 | Chester et al. |
| 2001/0056217 A1 | 12/2001 | Froment et al. |
| 2002/0063082 A1 | 5/2002 | Touvelle et al. |
| 2002/0170848 A1 | 11/2002 | Mohr et al. |
| 2003/0113248 A1 | 6/2003 | Mohr et al. |
| 2003/0171634 A1 | 9/2003 | Corma |
| 2003/0173254 A1 | 9/2003 | Chen et al. |
| 2004/0112793 A1 | 6/2004 | Dath et al. |
| 2004/0182745 A1 | 9/2004 | Chen et al. |
| 2005/0038306 A1 | 2/2005 | Beech et al. |
| 2006/0021912 A1 | 2/2006 | Chen et al. |
| 2006/0058562 A1 | 3/2006 | Choi et al. |
| 2006/0070422 A1 | 4/2006 | Kempf et al. |
| 2006/0084568 A1 | 4/2006 | Filimonov et al. |
| 2006/0108260 A1 | 5/2006 | Henry |
| 2006/0108261 A1 | 5/2006 | Steffens et al. |
| 2006/0135838 A1 | 6/2006 | Bagherzadeh et al. |
| 2007/0010699 A1 | 1/2007 | Choi et al. |
| 2007/0042904 A1 | 2/2007 | Xie et al. |
| 2007/0082809 A1 | 4/2007 | Choi et al. |
| 2007/0083071 A1 | 4/2007 | Choi et al. |
| 2008/0179219 A1 | 7/2008 | Gilbert et al. |
| 2008/0314799 A1 | 12/2008 | Li et al. |
| 2009/0012339 A1 | 1/2009 | Choi et al. |
| 2009/0134065 A1 | 5/2009 | Cheng et al. |
| 2009/0143629 A1 | 6/2009 | Voskoboynikov |
| 2009/0288990 A1 | 11/2009 | Xie et al. |
| 2010/0022810 A1 | 1/2010 | Sekiguchi et al. |
| 2010/0022811 A1 | 1/2010 | Sousa Aguiar et al. |
| 2010/0105974 A1 | 4/2010 | Towler et al. |
| 2010/0285950 A1 | 11/2010 | Le Van Mao |
| 2010/0312032 A1 | 12/2010 | Kang et al. |

FOREIGN PATENT DOCUMENTS

| | | |
|---|---|---|
| CN | 102371172 A | 3/2012 |
| EP | 0788838 B1 | 8/1997 |
| EP | 1114675 B1 | 7/2010 |
| WO | 9856740 A1 | 12/1998 |
| WO | 9856873 A1 | 12/1998 |
| WO | 9929804 A1 | 6/1999 |
| WO | 9929805 A1 | 6/1999 |
| WO | 0074847 A1 | 12/2000 |
| WO | 2005113437 A1 | 12/2005 |
| WO | 2005113438 A1 | 12/2005 |
| WO | 2005113439 A1 | 12/2005 |
| WO | 2006098712 A1 | 9/2006 |

OTHER PUBLICATIONS

Gao et al., "Characterization of Ti-ZSM-5 Prepared by Isomorphous Substituion of B-ZSM-5 with TiCl4 and Its Performance in the Hydroxylation of Phenol", Ind. Eng. Chem. Res. 2010, 49, 2194-2199.*

"Propylene Catalytic Properties Olefin Cracking Catalyst W-ZSM-5 C4," Journal of Molecular Catalysis, Jun. 2008, 22, 3, pp. 236-241.

"Catalysis: Ashaki Kasei industrializes its catalytic cracking process" Info Chimie Magazine; vol. 43, Issue 474, Abstract Only, 1 Page (2006).

Lee et al. "Catalytic cracking of n-octane over H-ZSM-5 catalysts: effect of calcination treatment," Korean Chem. Eng. Res., (2008) 46, pp. 291-300.

Machine Translation of CN102371172(A); Date of Publication: Mar. 14, 2012; 12 Pages.

Abrevaya, "Cracking of naphtha range alkanes and naphthenes over zeolites," Studies in Surface Science and Catalysis 120(B) (2007) pp. 1244-1251.

Al-Yassir, "Multifunctional Catalysts Used in the Thermo-catalytic Cracking of Hydrocarbon Feedstocks for the Production of Light Olefins," Ph.D. Dissertation, Concordia University 2008.

Anderson et al., "An attempt to predict the optimum zeolite-based catalyst for selective cracking of naphtha-range hydrocarbons to light olefins," Journal of Molecular Catalysis A: Chemical 181 (2002) 291-301.

Anderson et al., "Influence of Si/Zr Ratio on the Formation of Surface Acidity in Silica-Zirconia Aerogels," Journal of Catalysis 192, 344-364 (2000).

Bortnovsky et al., "Cracking of pentenes to C2-C4 light olefins over zeolites and zeotypes: Role of topology and acid site strength and concentration," Applied Catalysis A: General 287 (2005) 203-213.

Boyadjian et al., "Catalytic oxidative cracking of hexance as a route to olefins," Applied Catalysis A: General 372 (2010) pp. 167-174.

Corma et al. "The Chemistry of Catalytic Processes", Catalytic Science Series: Zeolites for Cleaner Technologies, Ed. Graham J. Hutchings, Imperial College Press, 2002, vol. 3, Ch. 2, pp. 29-55.

Ferrari et al., "Getting value from steam cracker C4/C5 olefin streams," 3 (2004) pp. 55-63.

Fricke et al., "Incorporation of Gallium into Zelites: Sythesis, Properties and Catalytic Application," Chem. Rev. 2000, 100, 2303-2405.

Guangwei et al., "Effect of Water Vapour on the Acidity of ZSM-5 Zeolite Used for Catalytic Cracking of Naphtha to manufacture Ethylene and Propylene", China Petroleum Processing and Petrochemical Technology, Dec. 2008, No. 4, pp. 33-39.

Guisnet et al., "Aromatization of short chain alkanes on zeolite catalysts," Applied Catalysis A General, 89 (1992) 1-30.

Hu et al., "Catalytic cracking of n-heptane over HZSM-5 catalysts with the activation of lattice oxygen," Catalysis Today 158 (2010) 504-509.

Huiming et al., "Synthesis of ZSM-5/MOR Co-crystalline Zeolite without Template and the Catalytic Application Thereof", Cina Petroleum Processing and Petrochemical Technology, Mar. 2009, No. 1, pp. 51-57.

Inagaki et al., "Selective formation of propylene by hexane cracking over MCM-68 zeolite catalyst," ChemComm (Feb. 23, 2010) 46 pp. 2662-2664.

International Search Report for International Application No. PCT/IB2014/061049; International Filing Date: Apr. 28, 2014; dated Jul. 30, 2014; 6 Pages.

Joshi et al., "High ethane dehydrogenation activity of [GaH]2+—Al pair sites in Ga/H—[Al]ZSM-5: A DFT thermochemical analysis of the catalytic sites under reaction conditions," Journal of Catalysis 246 (2007) 249-265.

(56) References Cited

OTHER PUBLICATIONS

Keyvanloo et al., Thermal Catalytic Cracking of Naphtha over CeO2 Supported on Carbon Nanotubes Coated with SiO2 for Olefin Production, Presented at the 22nd North American Catalysis Society Meeting, Jun. 2011 Detroit.
Keyvanloo"Comparing the catalytic performances of mixed molybdenum with cerium and lanthanide oxides supported on HZSM-5 by multiobjective optimization of catalyst compositions using nondominated sorting genetic algorithm," J. Anal.Appl.Pyro 88 2010 140.
Khodadadian et al., "A Deactivation Study of P—C3/HZSM-5 in Thermal Cracking of Naphtha by Response Surface Methodology," Presented at the 22nd North American Catalysis Society Meeting, Jun. 2011, Detroit.
Komatsu et al., "Selective formation of alkenes through the cracking of n-heptane on Ca2+-exhanged ferrierite," Applied Catalysis A: General (2001) pp. 103-109.
Komatsu, "Catalytic Cracking of Paraffins on Zeolite Catalysts for the Production of Light Olefins," Proceedings of the 20th Annual Saudi-Japan Symposium on Catalysts in Petroleum Refining & Petrochemicals, Dhahran, Saudi Arabia, Dec. 2010 pp. 122-131.
Kotrel et al., "The Haag-Dessau mechanism of protolytic cracking of alkanes," Microporous and Mesoporous Materials 35-36 (2000) 11-20.
Le Van Mao et al., "Catalytic Cracking of Heavy Olefins into Propylene, Ethylene and Other Light Olefins," Catal Lett (2009) 130: 86-92.
Li et al., "Interaction of titanium and iron oxide with ZSM-5 to tune the catalytic cracking of hydrocarbons," Applied Catalysis A: General 375 (2010) pp. 222-229.
Liu et al., "Pyrolysis Performances of Catalytic Cracking Naphtha and Coker Naphtha on Inert Carriers and an Active Catlayst," Energy Fuels (2009) vol. 23, pp. 5760-5764.
Liu et al., "Streaming and washing effect of P/HZSM-5 in catalytic cracking of naphtha," Catalysis Today 164 (2011) 154-157.
Mier et al., "Synergies in the produciton of olefins by combined cracking of n-butane and methanol on a HZSM-5 zeolite catalyst," Chemical Engineering Journal 160 (2010) 760-769.
Park et al., "Catalytic Cracking of Lower-Valued Hydrocarbons for Producing Light Olefins," Catal Surv. Asia (2010) 14: 75-84.
Petkowicz et al, "Photodegradation of methylene blue by in situ generated titania supported on a NaA zeolite," Applied Catalysis A: General 357 (2009) pp. 125-134.
Rahimi et al., "Catalytic cracking of hydrocarbons over modified ZSM-5 zeolites to produce light olefins: A review," Applied Catalysis A: General 398 (2011) pp. 1-17.
Rajagopal et al., "Silica-Alumina-Supported Mo Oxide Catalysts: Genesis and Demise of Bronsted-Lewis Acidity," Journal of Catalysis 151, pp. 192-203 (1995).
Raseev, Thermal and Catalytic Processes in Petroleum Refining, Marcel Dekker, Inc. New York, (2003), 72 Pages.
Scherzer, J. "Octane-Enhancing, Zeolitic FCC Catalysts: Scientific and Technical Aspects", Catalysis Reviews: Science and Engineering, 1989, vol. 31, No. 3, pp. 215-354.
Scott, "LG develops catalytic naphtha cracking process," Chemical Week 164 (21) (2002) p. 24.
Shao et al., "Study of the application of structural catalyst in naphtha cracking process for propylene production," Catalysis Today 147S (2009) S347-S351.
Subba Rao et al., "Titanium oxide loaded zeolites as photocatalysts for the cyclization of ethylenediamine with propylene glycol," Catalysis Letters vol. 90, Nos. 1-2, Sep. 2003, pp. 95-102.
Suciu, G. Dan (Ed.) "Theoretical Basis of Catalytic Cracking", Thermal and Catalytic Processes in Petroleum Refining, 2003, Chapter 6, pp. 275-421.
Tallman et al., "Naphtha cracking for light olefins production," Petroleum Technology Quarterly, Q3 2010 87-91.
Tallman, "Advanced Catalytic Olefins (ACO): First Commercial Demonstration Unit Begins Operations," Presented at the AIChE National Meeting, Mar. 2011, Chicago, 12 Pages.
Teimouri et al., "Designing a Stable HZSM-5 Catalyst Modified with Iron and Phosphorus in Thermal Catalytic of Naphtha for Light Olefin Production," Presented at the 22nd North American Catalysis Society Meeting, Jun. 2011 Detriot.
Viswanadham et al., "Enhanced octane boosting reactions of light naphtha on mesoporous ZSM-5," Catalysis Communications 9 (2008) 1894-1897.
Wan et al., "A ZSM-5-based Catalyst for Efficient Production of Light Olefins and Aromatics from Fluidized-bed Naphtha Catalytic Cracking," Catal Lett (2008) 124: 150-156.
Wei et al., "Production of light olefins and aromatic hydrocarbons through catalytic cracking of naphtha at lowered temperature," Studies in Surface Science and Catalysis vol. 158 (2005) pp. 1223-1230.
Weitkamp, "Zeolites and catalysis," Solid State Ionics 131 (2000) 175-188.
Written Opinion of the International Searching Authority for International Application No. PCT/IB2014/061049; International Filing Date: Apr. 28, 2014; dated Jul. 30, 2014; 8 Pages.
Yamaguchi et al., "Deactivation of ZSM-5 zeolite during catalytic steam cracking of n-hexane," Fuel Processing Technology 126 (2014) 343-349.
Yan et al., "Hybrid Catalysts used in teh Catalytic Steam Cracking process (CSC)," Applied Catalysis A: General 375 (2010) 63-69.
Yoshimura et al., "Catalytic cracking of naphtha to light olefins," Catalysis Surveys from Japan vol. 4, No. 2, 2000, pp. 157-167.
Yun Han et al., "Selective Formation of Light Olefins by the Cracking of Heavy Naphtha over Acid Catalysts," Studies in Surface Science and Catalysis 153 (2004) pp. 157-160.
Zhang et al., "Research on Catalytic Performance of W-Modified HZSM-5 Catalyst for C_4 Olefin Cracking," Journal of Molecular Catalysis (2008); 2 Pages.

\* cited by examiner

CATALYTIC METHODS FOR CONVERTING NAPHTHA INTO OLEFINS

CROSS REFERENCE TO RELATED APPLICATIONS

This application is a 371 of International Application No. PCT/IB2014/061049, filed Apr. 28, 2014, which claims priority to U.S. Patent Application No. 61/816,999, filed Apr. 29, 2013, which are incorporated herein by reference in their entirety.

FIELD OF THE INVENTION

The present disclosure relates to methods for refining oil to produce useful hydrocarbon products, and more particularly to catalytic methods for cracking naphthas to olefins, and zeolite catalysts employed in those methods.

BACKGROUND

Naphtha cracking is an important industrial method wherein useful chemicals, such as olefins, are produced from naphtha. The method of cracking of naphtha often includes the use of various catalyst compositions. The catalyst composition is a complex and unpredictable variable in achieving high selectivity for olefin, such as ethylene and propylene, production in methods for steam cracking naphtha, and in other oil refinery methods. Modified and unmodified zeolites (which are porous alumino-silicate solid materials that can occur naturally or be made synthetically) can be used to crack naphtha. Zeolites have become important catalysts in various petrochemical methods since the 1960s. Selective zeolite catalysts for the production of olefins from naphtha are desirable.

Accordingly, such zeolite catalysts and methods of using such catalysts are described herein.

SUMMARY

Disclosed herein are catalysts comprising a zeolite comprising at least one metal or ion thereof, wherein the at least one metal or ion thereof comprises barium, strontium, titanium, tungsten, or a mixture thereof, and wherein the zeolite does not comprise molybdenum or phosphorus.

Also disclosed herein are methods for the catalytic cracking of naphtha to olefins, comprising the steps of:
a) providing a feed stream comprising naphtha and steam, and
b) contacting the feed stream with a zeolite catalyst comprising at least one metal or ion thereof comprising barium, strontium, titanium, or tungsten, or a mixture thereof, and wherein the zeolite catalyst does not comprise molybdenum, or phosphorus, thereby producing olefins.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compounds, compositions, articles, devices, and/or methods are disclosed and described, it is to be understood that the aspects described below are not limited to specific synthetic methods, specific examples, etc., as such can, of course, vary. It is also to be understood that the terminology used herein is for the purpose of describing particular aspects only and is not intended to be limiting.

In this specification and in the claims which follow, reference will be made to a number of terms which shall be defined to have the following meanings:

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

"Optional" or "optionally" means that the subsequently described event or circumstance can or cannot occur, and that the description includes instances where the event or circumstance occurs and instances where it does not. For example, the phrase "optionally substituted lower alkyl" means that the lower alkyl group can or cannot be substituted and that the description includes both unsubstituted lower alkyl and lower alkyl where there is substitution.

Ranges may be expressed herein as from " " one particular value, and/or to " " another particular value. When such a range is expressed, another aspect includes from the one particular value and/or to the other particular value. Similarly, when values are expressed as approximations, by use of the antecedent "," it will be understood that the particular value forms another aspect. It will be further understood that the endpoints of each of the ranges are significant both in relation to the other endpoint, and independently of the other endpoint.

As used herein "naphtha" refers to a complex mixture of liquid hydrocarbons typically having between 5 and 12 carbon atoms that are typically obtained from natural gas condensates and/or the distillation of petroleum. Full range naphthas boil between 30° C. and 200° C. Light naphthas are a light fraction boiling between 35° C. and 100° C., which predominantly contain saturated paraffins and isoparaffins having 5-6 six carbon atoms, along with smaller amounts of aromatics such as naphthalenes. Naphtha can, for example, consist of 54.7% alkanes, 34.3% iso-alkanes, 9.5% naphtheses, and 1.5% aromatics. Naphtha can, for example, have an initial boiling point of 48.3° C.

Naphthas are commonly used in the refinery industry as a primary feedstock for several downstream refinery methods and products, including as a feedstock for steam cracking to produce higher value olefins, including ethylene, propylene, 1-butene, 2-butene, isobutene, and butadiene. Typically, selectively high yields of light olefins such as ethylene and propylene are desired. Thus, the term "cracking naphtha" or the like terms refer to a method comprising producing olefins, such as ethylene and propylene, from naphtha.

The terms "catalyst" and "zeolite catalyst" are used interchangeably herein.

References in the specification and concluding claims to parts by weight, or parts by mass of a particular element or component in a composition or article, denote the weight relationship between the element or component and any other elements or components in the composition or article for which a part by weight or mass is expressed. Thus, in a compound containing 2 parts by weight of component X and 5 parts by weight of component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

1. Zeolite Catalysts

Zeolites are microporous aluminosilicates that comprise $SiO_4$ and $AlO_4$ tetrahedral linked at their corners via common oxygen atoms. The overall linked tetrahedral units comprise formula units corresponding to $SiO_2$ and $AlO_2^-$ subunits, wherein one negative charge resides at each tetrahedron with an Al atom at its center. This arrangement can result in porous inorganic macromolecular solids comprising networks of channels, channel intersections, and/or cages with dimensions similar to the dimensions of organic small molecules. Inside the voids in the structures are small cations (often metallic cations, such as $Na^+$ or $K^+$ cations, or sometimes small organic ammonium cations) which compensate the negative charge of the aluminosilicate framework, but there is often extra room inside the voids for the adsorption of water or other small molecules.

As disclosed by Weitkamp, zeolites occur in many forms in nature and have been known for almost 250 years, but natural zeolites typically contain undesirable impurities and varying structures that are not well suited for catalytic applications. Naturally occurring forms are of limited value. Over the last 60 years or so, much progress has been made in the synthesis of artificial zeolites, which have much more consistent and controlled structures and much better purity, which enable them to exhibit much better activity for catalyzing chemical reactions of adsorbed molecules. Many classes and species of synthetic zeolites having catalytic activity are known to those of skill in the art, as described in the Atlas of Zeolite Framework Types, eds. Ch. Baerlocher, W. H. Meier, and D. H. Olson, Elsevier, Fifth Edition, 2001 (hereinafter referred to as "the Atlas"), which is hereby incorporated by reference.

It is also well known in the art that the small cations within the zeolites (as a result of typical synthetic procedures carried out under basic conditions) can be removed by ion-exchange with $NH_4^+$ ammonium cations, then the ammonium ion exchanged zeolites can be thermolyzed to liberate ammonia, leaving behind sites on the catalyst framework comprising Bronstead acidic $H^+$ cations attached to oxygen atoms in the framework, thus forming zeolites that are solid acids. In practice, a zeolite being in the hydrogen form can be quantified by experimentally showing by measurements that its sodium or potassium content is very low, for example below 0.1, 0.05, 0.02 or 0.01 weight %.

Zeolites in the acid form typically show dramatic improvements in the rates of many reactions of small organic molecules. Zeolites also have Lewis acid sites related to aluminum sites in the zeolite lattice. However, any aluminosilicate zeolite that shows activity in converting hydrocarbons, both aliphatics and aromatics to olefins, before modifying the zeolite with the metal compounds of the invention as disclosed herein, may be employed.

Disclosed herein are heterogeneous catalysts for various methods, including steam cracking of naphthas, wherein the catalyst comprises a zeolite comprising at least one metal or ion thereof, wherein the at least one metal or ion thereof comprises barium, strontium, titanium, tungsten, or a mixture thereof, and wherein the zeolite does not comprise molybdenum, or phosphorus.

Aluminosilicate zeolites can also be characterized by the $Si/Al_2$ molecular or atomic ratio of their framework. This ratio can vary widely in the catalyst composition used in accordance to the invention. In some aspects, the $Si/Al_2$ ratio is from 5 to 1000, or from 20 to 500, from 25 to 300, from 25 to 100, from 25 to 75, from 25 to 50, from 25 to 40, or from 25 to 30. In another aspect, the $Si/Al_2$ ratio is 27.

The pore size of the zeolite is not specifically critical, and can be of small, medium or large size; according to the classifications generally used in the art. In some aspects, the pores are of medium size, which means the pores are from 3 Å to 7 Å, but in other aspects, 4-6 Å. In some aspects, the zeolites have pores comprising 10 silicon or aluminum based tetrahedral, units, i.e. a 10-ring structure.

Examples of suitable zeolite materials include the ZSM-series, beta aluminosilicate, or mixtures thereof. Suitable zeolite materials, include but are limited to, ZSM-5, ZSM-8, ZSM-11, ZSM-12, ZSM-22, ZSM-23, ZSM-35, ZSM-38, ZSM-48 and ZSM-57, in their acid forms optionally designated by the addition of "H" to the acronym, which comprise Bronsted acid sites. In one aspect, the zeolite material is ZSM-5, ZSM-11, ZSM-23, ZSM-48 and ZSM-57 and their respective acid forms. In one aspect, the zeolite can be in its acid form. Acid from zeolites from the ZSM-series are named "HZSM." In yet another aspect, the zeolite can be HZSM-5.

To prepare the catalysts of the inventions, the aluminosilicate zeolite is treated with one or more metallic compounds, wherein the one or more metallic compounds comprise one or more metal atoms or ions selected from barium, strontium, titanium, tungsten, or a mixture thereof, and the zeolite does not comprise molybdenum, or phosphorus. In another aspect, the zeolite does not comprise vanadium. In some aspects, all the metal atoms or ions used to treat the zeolite are barium. In some aspects, all the metal atoms or ions used to treat the zeolite are strontium. In some aspects, all the metal atoms or ions used to treat the zeolite are titanium. In some aspects, all the metal atoms or ions used to treat the zeolite are tungsten. In another aspect, the zeolite catalyst is an HZSM-5 type catalyst, and the metal atoms or ions are titanium.

The metallic compounds used to treat the zeolites can be any inorganic salts of barium, strontium, titanium, or tungsten including oxide, hydroxide, halide, nitrate, or carbonate, or carboxylic acid salts, or any organometallic barium, strontium, titanium, or tungsten compound, or any other available source known to those of ordinary skill in the art.

In one aspect, the zeolite catalyst comprises from 0.5 to 20 percent by weight of the at least one metal or ion thereof. In another aspect, the zeolite catalyst comprises from 0.5 to 15 percent by weight of the at least one metal or ion thereof. In yet another aspect, the zeolite catalyst comprises from 0.5 to 10 percent by weight of the at least one metal or ion thereof. In yet another aspect, the zeolite catalyst comprises from 0.5 to 8 percent by weight of the at least one metal or ion thereof. In yet another aspect, the zeolite catalyst comprises from 0.5 to 6 percent by weight of the at least one metal or ion thereof. In yet another aspect, the zeolite catalyst comprises from 0.5 to 4 percent by weight of the at least one metal or ion thereof. In yet another aspect, the zeolite catalyst comprises from 0.5 to 2 percent by weight of the at least one metal or ion thereof. In yet another aspect, the zeolite catalyst comprises from 1 to 10 percent by weight of the at least one metal or ion thereof. In yet another aspect, the zeolite catalyst comprises from 1 to 8 percent by weight of the at least one metal or ion thereof. In yet another aspect, the zeolite catalyst comprises from 1 to 6 percent by weight of the at least one metal or ion thereof. In yet another aspect, the zeolite catalyst comprises from 1 to 5 percent by weight of the at least one metal or ion thereof. In yet another aspect, the zeolite catalyst comprises from 1 to 4 percent by weight of the at least one metal or ion thereof. In yet another aspect, the zeolite catalyst comprises from 1 to 3 percent by weight of the at least one metal or ion thereof. In yet another aspect, the zeolite catalyst comprises from 3 to 5 percent by weight of the at least one metal or ion thereof.

The metallic compounds used to treat the zeolites can be insoluble in any solvent, or can be soluble in common solvents such as water, alcohols, organic sulfoxides or sulfones, carboxylic acids or esters, ethers, hydrocarbons, etc. If the metallic compound is insoluble in any suitable solvent, the zeolite can be treated with the metallic compound by making a physical mixture of zeolite and the metallic compound, and calcining the mixture. If the metallic compound is soluble in a suitable solvent, a solution of the metallic compound can be used to treat the zeolite, followed by removal of the solvent from the zeolite by filtration, evaporation, etc., then calcining the treated zeolite catalyst. The details of the method of catalyst preparation may play a role in determining whether the barium, strontium, titanium, or vanadium compounds or barium, strontium, titanium, or vanadium atoms or ions derived therefrom are incorporated into the framework of the zeolite, as counter-cations of the zeolite, in the form of metal compounds such as oxides, or on the zeolite surface, or combinations of those.

In many aspects, the one or more metallic compounds comprise only titanium metal atoms or ions, and the catalyst is prepared by treating the zeolite with various titanium compounds, whether soluble or insoluble in common solvents. In some aspects, the titanium compound used to treat the zeolites is at least initially soluble in common solvents, in order to facilitate contact and dispersion of the titanium into the pores and channels of the zeolites. Soluble titanium compounds such as titanium tetrachloride, titanium methoxide, titanium ethoxide, or titanium isopropoxide, or mixtures thereof. In many embodiments, the one or more metallic compounds used to treat the zeolite can be titanium tetrachloride. If titanium tetrachloride is used to treat the zeolites, water is a suitable solvent for the titanium tetrachloride. If titanium methoxide, titanium ethoxide, or titanium isopropoxide is used to treat the zeolites, the corresponding alcohol (methanol, ethanol, isopropyl alcohol) is a suitable solvent. Comparative results of naphtha cracking experiments using zeolite catalysts treated with soluble titanium compounds are shown in Tables 3.1-3.4 below.

It is likely that the metallic compounds used to treat the zeolites undergo some change after contact with the zeolites, and the treated zeolites are calcined. It is however unknown whether the various metal atoms or ions used to modify the zeolites are inserted into the framework structure of the zeolites; or become positive counter-ions for negative charges in the zeolite; or reside on the zeolite's surface, e.g. in the form of metal oxides; but in particular modified zeolite compositions the metal atoms or ions can be present in any of the forms, or a combination of these forms.

A certain minimum proportion of the metal atoms or ions (Ba, Sr, Ti, and/or W) comprised in the treated zeolite are needed in order to improve the yields of the methods disclosed herein for the reforming of naphthas. In many embodiments, the treated catalyst contains at least: 0.2, 0.5, 1, 1.5, 2, 4, 6, 8 or 10 mass % of metal atoms or ions selected from Ba, Sr, Ti, and/or W. However, it is known that if the metal content in zeolite is too high then the pores of the zeolite can become at least partly clogged, impeding the performance of the treated zeolites. Therefore, the metal atom or ion content of the catalyst can be at most: 20, 10, 8, 6, or 4 weight %. In some embodiments, the treated zeolite catalyst comprises from 1 to 20 weight % of the one or more Ba, Sr, Ti, and/or W metal atoms or ions, or in some aspects from 2 to 10 weight % of the one or more Ba, Sr, Ti, and/or W metal atoms or ions. In one aspect, the treated zeolite catalyst comprises from 0.5 to 10 weight % of the one or more Ba, Sr, Ti, and/or W metal atoms or ions, such as, for example, Ti metal atoms or ions.

After the aluminosilicate zeolites have been treated with the one or more metallic compounds, the treated zeolite particles can be optionally formed into larger catalyst pellets, optionally by inclusion of a binder (matrix material). Binders are resistant to the temperatures and other conditions e.g., mechanical attrition, which occur during cracking.

The binder and/or matrix material can fulfill both physical and catalytic functions. Matrix materials include active or inactive inorganic materials such as clays, and/or metal oxides such as alumina or silica, titania, zirconia, or magnesia. The metal oxide may be in the form of a sol or a gelatinous precipitate or gel.

Naturally occurring clays that can be employed with the treated aluminosilcate zeolite catalysts include the montmorillonite and kaolin families which include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification. In addition to the foregoing materials, catalyst can include a porous matrix material such as silica-alumina, silica-magnesia, silica-zirconia, silica-thoria, silica-beryllia, silica-titania, as well as ternary materials such as silica-alumina-thoria, silica-alumina-zirconia, silica-alumina-magnesia, or silica-magnesia-zirconia. The matrix can be in the form of a cogel. A mixture of these components can also be used.

In general, the relative proportions of molecular sieve component(s) and inorganic oxide binder vary widely, with the molecular sieve content ranging from 1 to 90 percent by weight, and more usually from 20 to 50 weight percent of the catalyst. Generally, the catalyst particle size will range from 10 to 300 microns in diameter, with an average particle diameter of 60 microns. The surface area of the matrix material will typically be less than 350 $m^2/g$, from 50 to 200 $m^2/g$, or from 50 to 100 $m^2/g$. While the surface area of the final catalysts will be dependent on such things as type and amount of molecular sieve used, it will usually be less than 500 $m^2/g$, or from 50 to 300 $m^2/g$, or from 50 to 250 $m^2/g$, or from 50 to 150 $m^2/g$.

In one aspect, the zeolite is an HZSM-5 type zeolite having a $Si/Al_2$ ratio of 27, and wherein the metal or ion thereof is titanium. In one aspect, the zeolite is an HZSM-5 type zeolite having a $Si/Al_2$ ratio of 25 to 30, and wherein the metal or ion thereof is titanium.

In one aspect, the catalyst converts naphtha into a product comprising at least 44 percent by weight ethylene and/or propylene. In another aspect, the catalyst converts naphtha into a product comprising at least 45 percent by weight ethylene and/or propylene. In yet another aspect, the catalyst converts naphtha into a product comprising at least 46 percent by weight ethylene and/or propylene. In yet another aspect, the catalyst converts naphtha into a product comprising at least 47 percent by weight ethylene and/or propylene. In yet another aspect, the catalyst converts naphtha into a product comprising at least 48 percent by weight ethylene and/or propylene. In yet another aspect, the catalyst converts naphtha into a product comprising at least 49 percent by weight ethylene and/or propylene. In yet another aspect, the catalyst converts naphtha into a product comprising at least 50 percent by weight ethylene and/or propylene.

In one aspect, the catalyst converts naphtha into a product comprising at least 22 percent by weight ethylene. In another aspect, the catalyst converts naphtha into a product comprising at least 24 percent by weight ethylene. In yet another aspect, the catalyst converts naphtha into a product comprising at least 25 percent by weight ethylene. In yet another aspect, the catalyst converts naphtha into a product comprising at least 26 percent by weight ethylene. In yet another aspect, the catalyst converts naphtha into a product comprising at least 27 percent by weight ethylene. In yet another aspect, the catalyst converts naphtha into a product comprising at least 28 percent by weight ethylene.

In one aspect, the catalyst converts naphtha into a product comprising at least 17 percent by weight propylene. In another aspect, the catalyst converts naphtha into a product comprising at least 18 percent by weight propylene. In yet another aspect, the catalyst converts naphtha into a product comprising at least 19 percent by weight propylene. In yet another aspect, the catalyst converts naphtha into a product comprising at least 20 percent by weight propylene. In yet another aspect, the catalyst converts naphtha into a product comprising at least 21 percent by weight propylene. In yet another aspect, the catalyst converts naphtha into a product comprising at least 22 percent by weight propylene. In yet another aspect, the catalyst converts naphtha into a product comprising at least 23 percent by weight propylene.

2. Methods for Catalytically Cracking Naphthas to Olefins

Also described herein are methods for the catalytic cracking of naphthas to olefins, comprising the steps of:
a) providing a feed stream comprising naphtha and steam, and
b) contacting the feed stream with a zeolite catalyst comprising at least one metal or ion thereof comprising barium, strontium, titanium, or tungsten, or a mixture thereof, and wherein the zeolite catalyst does not comprise molybdenum, or phosphorus, thereby producing olefins.

The catalyst described elsewhere herein can be used in the disclosed methods.

Naphtha is a complex mixture of liquid hydrocarbons typically having between 5 and 12 carbons. Full range naphthas boil between 30° C. and 200° C. The light naphthas that are often cracked to light olefins such as ethylene and propylene are a naphtha fraction boiling between 35° C. and 100° C., and in some aspects boiling from 45° C. to 90° C. Light naphthas predominantly contain saturated paraffins (alkanes) and isoparafins (isoalkanes) having 5-6 six carbon atoms, and often contain from 20 wt % to 95 wt %, or from 25 wt % to 80 wt % or from 30 wt % to 60 wt % of paraffins and isoparaffins. Light naphthas can also contain naphthalenes, often in the range 1 wt % to 10 wt % or in the range 5 wt % to 8 wt %, as well as some other light aromatics (such as benzene, toluene, and xylenes) in the range from 1 wt % to 5 wt %. The naphtha feed stream can also comprise ethane, propane, butane, Fischer-Tropsch liquids, butenes, and butadiene. An often used feedstock is light straight run naphtha (LSRN) which includes alkanes, iso-alkanes, naphthalene and aromatics.

In the various methods for the catalytic cracking of naphthas to olefins described herein, the feed to the method comprises at least naphtha and steam, typically in mass ratios of steam to naphtha from 0.1 to 4.0, or from 0.5 to 4.0. Steam serves, at least in part, as a diluent that aids the yield and selectivity of the catalytic cracking methods of the invention. The feed stream for the methods may optionally contain one or more additional diluents, the concentrations of which may vary over a wide range, such as, for example, where the mass ratio of diluents to naphtha is maintained from 9 to 0.1. Examples of suitable diluents include helium, nitrogen, carbon dioxide, methane, ethane, and mixtures thereof.

The step of contacting the feed stream with the catalyst can be carried out with any conventional equipment, as known to those of ordinary skill in the art, for example in a fixed bed continuous flow reactor system, a moving bed, a fluidized bed, such as a riser or dense fluid bed system, or a stationary fluid bed system or any other circulating bed reactor.

The contacting step may be performed at a temperature range from 500° C. to 750° C., or from 550° C. to 700° C., or from 600° C. to 650° C. The naphtha cracking methods of the invention can be conducted at any suitable pressure ranging from atmospheric to higher pressures. Suitable pressures can be from 0.1 MPa to 3 MPa, or at pressures up to 2.5, 2.0, 1.5, 1.0 or 0.5 MPa. In many embodiments of the inventions, the contacting is carried out at a temperature from 500° C. to 750° C., and a pressure from 0.1 MPa to 3 MPa.

The flow rate at which the feed stream is fed to the reactor may vary widely, but is often operated such that a weight hourly space velocity (WHSV) results from 0.1 to 100 $h^{-1}$, or a WHSV is from 0.5 to 100 $h^{-1}$, or from 1 to 50 $h^{-1}$. WHSV is the ratio of the rate at which the feed stream is fed to the reactor (in weight or mass per hour) divided by the weight of catalyst composition in said reactor; and is thus inversely related to contact time.

In the methods described herein, the conversion of the naphtha feed steam can be from 30% to 90% of the feed stream by weight, or can be from 50% to 85% of the feed stream by weight. In many embodiments, the conversion of the naphtha feed steam is greater than 80%.

The methods described herein are unexpectedly selective for the production of desirable light olefins, especially ethylene and propylene. The product streams of the invention can produce a higher proportion of ethylene to propylene than is usually obtained in prior art catalytic cracking methods. The product stream of the methods described herein can produce an ethylene/propylene weight ratio greater than 0.60, or greater than 0.70, or greater than 0.80, or greater than 0.85. Use of diluents, such as steam, tends to increase the ethylene/propylene ratio in the product.

In desirable aspects of the inventions, the conversion of the naphtha feed is greater than 80%, the yield of ethylene plus propylene is greater than 40%, and the ratio of ethylene to propylene is greater than 0.70.

In the methods described herein, a substantial selectivity of the cracking reactions to ethylene and propylene is produced, so that the total amount of ethylene plus propylene can be greater than 40 wt %, or greater than 45 wt %, or greater than 50 wt % as a percentage of the hydrocarbons in the product stream. The product stream can be unexpectedly selective against the formation of less desirable products such as aromatics, which can comprise less than 3 wt %, or less than 2 wt % of aromatics. In some embodiments, the product stream does not contain any chemically significant and/or measurable quantity of methane or ethane.

In one aspect, the method produces a product comprising at least 44 percent by weight ethylene and/or propylene. In another aspect, the method produces a product comprising at least 45 percent by weight ethylene and/or propylene. In yet another aspect, the method produces a product comprising at least 46 percent by weight ethylene and/or propylene. In yet another aspect, the method produces a product comprising at least 47 percent by weight ethylene and/or propylene. In yet another aspect, the method produces a product comprising at least 48 percent by weight ethylene and/or propylene. In yet another aspect, the method produces a product comprising at least 49 percent by weight ethylene and/or propylene. In yet another aspect, the method produces a product comprising at least 50 percent by weight ethylene and/or propylene.

In one aspect, the method produces a product comprising at least 22 percent by weight ethylene. In another aspect, the method produces a product comprising at least 24 percent by weight ethylene. In yet another aspect, the method produces a product comprising at least 25 percent by weight ethylene. In yet another aspect, the method produces a product comprising at least 26 percent by weight ethylene. In yet another aspect, the method produces a product comprising at least 27 percent by weight ethylene. In yet another aspect, the method produces a product comprising at least 28 percent by weight ethylene.

In one aspect, the method produces a product comprising at least 17 percent by weight propylene. In another aspect, the method produces a product comprising at least 18 percent by weight propylene. In yet another aspect, the method produces a product comprising at least 19 percent by weight propylene. In yet another aspect, the method produces a product comprising at least 20 percent by weight propylene. In yet another aspect, the method produces a product comprising at least 21 percent by weight propylene. In yet another aspect, the method produces a product comprising at least 22 percent by weight propylene. In yet another aspect, the method produces a product comprising at least 23 percent by weight propylene.

ASPECTS

Aspect 1

A catalyst comprising a zeolite comprising at least one metal or ion thereof, wherein the at least one metal or ion thereof comprises barium, strontium, titanium, tungsten, or a mixture thereof, and wherein the zeolite does not comprise molybdenum or phosphorus.

Aspect 2

The catalyst of any of Aspects 1, 40, and 41, wherein the at least one metal or ion thereof comprises barium.

Aspect 3

The catalyst of any of Aspects 1, 2, 40, and 41 wherein the at least one metal or ion thereof comprises strontium.

Aspect 4

The catalyst of any one of Aspects 1-3, 40, and 41, wherein the at least one metal or ion thereof comprises titanium.

Aspect 5

The catalyst of any one of Aspects 1-4, 40, and 41, wherein the at least one metal or ion thereof comprises tungsten.

Aspect 6

The catalyst of any one of Aspects 1-5, 40, and 41, wherein the zeolite catalyst comprises from 0.5 to 20 percent by weight of the at least one metal or ion thereof.

Aspect 7

The catalyst of any one of Aspects 1-5, 40, and 41, wherein the zeolite catalyst comprises from 1 to 6 percent by weight of the at least one metal or ion thereof.

Aspect 8

The catalyst of any one of Aspects 1-5, 40, and 41, wherein the zeolite catalyst comprises 3 to 5 (e.g., 4) percent by weight of the at least one metal or ion thereof.

Aspect 9

The catalyst of any one of Aspects 1-8, 40, and 41, wherein the zeolite has a $Si/Al_2$ ratio from 25 to 300.

Aspect 10

The catalyst of any one of Aspects 1-8, 40, and 41, wherein the zeolite has a $Si/Al_2$ ratio of 27.

Aspect 11

The catalyst of any one of Aspects 1-10, 40, and 41, wherein the zeolite is an HZSM-5 type zeolite.

Aspect 12

The catalyst of any one of Aspects 1-10, 40, and 41, wherein the metal originates from treating the zeolite with a metal precursor.

Aspect 13

The catalyst of Aspect 12, wherein the metal precursor comprises titanium tetrachloride.

Aspect 14

The catalyst of any one of Aspects 1-13, 40, and 41, wherein the catalyst further comprises a binder.

Aspect 15

The catalyst of any one of Aspects 1-14, 40, and 41, wherein the catalyst converts naphtha into a product comprising at least 44 percent by weight ethylene and/or propylene.

Aspect 16

The catalyst of any one of Aspects 1-15, 40, and 41, wherein the catalyst converts naphtha into a product comprising at least 45 percent by weight ethylene and/or propylene.

Aspect 17

The catalyst of any one of Aspects 1-16, 40, and 41, wherein the catalyst converts naphtha into a product comprising at least 47 percent by weight ethylene and/or propylene.

Aspect 18

The catalyst of any one of Aspects 1-17, 40, and 41, wherein the catalyst converts naphtha into at least 24 percent by weight ethylene.

Aspect 19

The catalyst of any one of Aspects 1-18, 40, and 41, wherein
a) the zeolite is an HZSM-5 type zeolite;
b) the HZSM-5 type zeolite has a $Si/Al_2$ ratio of 27; and
c) the metal or ion thereof is titanium.

Aspect 20

A method for the catalytic cracking of naphtha to olefins, comprising the steps of:
a. providing a feed stream comprising naphtha and steam; and
b. contacting the feed stream with the catalyst of any of Aspects 1-19, 40, and 41, thereby producing olefins.

Aspect 21

The method of Aspect 20, wherein the at least one metal or ion thereof comprises barium.

Aspect 22

The method of Aspects 20 or 21, wherein the at least one metal or ion thereof comprises strontium.

Aspect 23

The method of any one of Aspects 20-22, wherein the at least one metal or ion thereof comprises titanium.

Aspect 24

The method of any one of Aspects 20-23, wherein the metal at least one metal or ion thereof comprises tungsten.

Aspect 25

The method of any one of Aspects 20-24, wherein the zeolite comprises Bronsted acid sites.

Aspect 26

The method of any one of Aspects 20-25, wherein the zeolite comprises from 0.5 to 20 percent by weight of the metal or ion thereof.

Aspect 27

The method of any one of Aspects 20-26, wherein the zeolite catalyst has a Si/Al$_2$ ratio from 25 to 300.

Aspect 28

The method of any one of Aspects 20-27, wherein the zeolite is an HZSM-5 type zeolite.

Aspect 29

The method of any one of Aspects 20-28, wherein the zeolite catalyst has pore sizes between 3 Å to 7 Å.

Aspect 30

The method of any one of Aspects 20-29, wherein the naphtha feed stream comprises an alkane, an iso-alkane, naphthalene, and an aromatic, and has a boiling range from 35° C. to 100° C.

Aspect 31

The method of any one of Aspects 20-30, wherein the steam to naphtha mass ratio in the feed stream is from 0.1 to 4.0.

Aspect 32

The method of any one of Aspects 20-31, wherein the feed stream comprises diluents comprising nitrogen gas, methane, ethane, or a mixture thereof, and wherein the molar ratio of diluents to naphtha is maintained from 9 to 0.1.

Aspect 33

The method of any one of Aspects 20-32, wherein the contacting is carried out at a temperature from 500° C. to 750° C., and a pressure from 0.1 MPa to 3 MPa.

Aspect 34

The method of any one of Aspects 20-33, wherein the contacting is carried out at a weight hourly space velocity from 0.1 to 100 h$^{-1}$.

Aspect 35

The method of any one of Aspects 20-34, wherein the product stream comprises ethylene and propylene at an ethylene to propylene weight ratio of greater than 0.6.

Aspect 36

The method of any one of Aspects 20-35, wherein the method yields at least 44% of ethylene plus propylene.

Aspect 37

The method of any one of Aspects 20-35, wherein the method yields at least 45% of ethylene plus propylene.

Aspect 38

The method of any one of Aspects 20-35, wherein the method yields at least 47% of ethylene plus propylene.

Aspect 39

The method of any one of Aspects 20-38, wherein
a. the conversion of the naphtha feed is greater than 80%,
b. the yield of ethylene plus propylene is greater than 40% by weight, and
c. the ratio of ethylene to propylene is greater than 0.70.

Aspect 40

A catalyst comprising a zeolite comprising at least one metal or ion thereof, wherein the at least one metal or ion thereof comprises barium, strontium, titanium, tungsten, or a mixture thereof, and wherein the zeolite is free of molybdenum or phosphorus.

Aspect 41

A catalyst comprising a zeolite comprising at least one metal or ion thereof, wherein the at least one metal or ion thereof comprises barium, strontium, titanium, tungsten, or a mixture thereof, and wherein the zeolite has 0 wt % molybdenum and 0 wt % phosphorus.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described method. Only reasonable and routine experimentation will be required to optimize such method conditions.

1. Example 1—Catalyst Preparations

1A) HZSM-5 Modified with 2 wt % Ti (From $TiCl_4$)—
0.0801 g of $TiCl_4$ was dissolved in 30.0 ml water at ambient temperature and stirred for 2 h. Then, 1 g of ZSM-5 (obtained from Zeolyst International of Valley Forge Pa.), $Si/Al_2$=27, $NH_4$ form was added to the above solution in order to produce a solid comprising 2.0 wt % Ti. The resulting mixture was stirred for 3 h and water was removed by slow evaporation at 60° C. in a drying oven. The product was then dried at 100° C. overnight followed by calcination in standing air at a heating rate of 3° C./min to 650° C., with a holding time of 5 h.

1B) HZSM-5 Modified with 2 wt % Ti (From Ti Alkoxides)

In the case of other Ti precursors, methanol, ethanol, and isopropanol were used as solvents for Ti-methoxide, Ti-ethoxide and Ti-isopropoxide, respectively. In one example, 0.0740 g of Ti-methoxide, 0.098 g Ti-ethoxide, or 0.1221 g Ti-isopropoxide were dissolved in 30.0 ml methanol, ethanol or isopropanol, respectively, at ambient temperature and stirred for 2 h. To anyone of these solutions, 1 g of HZSM-5 (Zeolyst; 3024E, Nominal $Si/Al_2$=27, $NH_4$-form) was added in order to produce a solid comprising 2.0 wt % Ti. The resulting mixture was stirred for 3 h and water was removed by slow evaporation at 60° C. in a drying oven. The product was then dried at 100° C. overnight followed by calcination in standing air at a heating rate of 3° C./min to 650° C., with a holding time of 5 h.

1C) HZSM-5 Modified with 2 wt % BA, SR.

In one example, 0392 g of $Ba(NO_3)_2$ or 0.0497 g $Sr(NO_3)_2$ was dissolved in 30.0 ml water at ambient temperature and stirred for 2 h. To anyone of these solutions, 1 g of HZSM-5 (Zeolyst; 3024E, Nominal $Si/Al_{2=27}$, $NH_4$-form) was added in order to produce a solid comprising 2.0 wt % Ba or Sr, respectively. The resulting mixture was stirred for 3 h and water was removed by slow evaporation at 60° C. in a drying oven. The product was then dried at 100° C. overnight followed by calcination in standing air at a heating rate of 3° C./min to 650° C., with a holding time of 5 h.

1D) HZSM-5 Modified with 2 wt % V, CR, MN, FE.

In one example, 0.0473 g of $NH_4VO_3$, 0.158 g $Cr(NO_3)_3$, 0.0942 g $Mn(NO_3)_3$ or 0.149 g $Fe(NO_3)_3$ was dissolved in 30.0 ml water at ambient temperature and stirred for 2 h. To anyone of these solutions, 1 g of HZSM-5 (Zeolyst; 3024E, Nominal $Si/Al_{2=27}$, $NH_4$-form) was added in order to produce a solid comprising 2.0 wt % V, Cr, Mn or Fe. The resulting mixture was stirred for 3 h and water was removed by slow evaporation at 60° C. in a drying oven. The product was then dried at 100° C. overnight followed by calcination in standing air at a heating rate of 3° C./min to 650° C., with a holding time of 5 h.

2. Naphtha Cracking Experiments

Naphtha-steam cracking experiments were conducted on the catalysts whose preparation is described above in a fixed-bed continuous flow reactor system (BTRS-JR reactor) from Autoclave Engineers. The reactor tube is made of Hastelloy having dimensions of 20 mm ID and 20 cm length. Straight run naphtha (SRN—whose composition is described below) and water were simultaneously and continuously injected into the reactor using two separate HPLC pumps (Gilson). A gaseous stream containing $N_2$ as a carrier gas (5.00 ml/min was then sent into the reactor tube which had been packed with 1.00 g of catalyst. Weight hourly space velocity (WHSV)=grams of SRN injected per hour per gram of catalyst=5.00 $h^{-1}$, steam/naphtha molar ratio=0.6, reaction temperature=650° C., duration of the experiment=6 h. Gaseous and liquid products were collected separately using a system of condensers. The gas-phase components were analyzed using a Shimadzu GS-alumina micropacked column GC equipped with FID and TCD detectors. Liquid phase analysis was carried out using a Shimadzu PIONA GC equipped with FID detector.

Table 1 shows the composition and properties of the naphtha used in the examples described herein.

TABLE 1

| Composition of SRN Naphtha Used as Feed for Catalytic Experiments | |
|---|---|
| Property | Data |
| Density (20° C.) $kg/m^3$ | 657 |
| Boiling Range | |
| Initial Boiling Point, ° C. | 48.3 |
| End Boiling Point, ° C. | 88.4 |
| Saturated vapor pressure (20° C.) KPa | 70.4 |
| Chemical Composition (wt %) | |
| Alkane | 54.70 |
| Iso-alkane | 34.30 |
| Naphthenes | 9.60 |
| Aromatics | 1.50 |

Table 2 shows the results of the catalytic cracking of naphtha using exemplary zeolite catalysts as described herein. Improved catalytic performance is observed of the exemplary zeolite catalysts as compared to an unmodified HZSM-5 zeolite.

TABLE 2

Catalytic cracking of LSRN over Various Metal Modified HZSM-5 (Si/Al$_2$ = 27) at 2 wt % metal loading

|  | Pure HZSM-5 | Sr | Ba | Ti | V | Cr | Mn | Fe |
|---|---|---|---|---|---|---|---|---|
| Conversion (%) | 77.3 | 81.1 | 82.5 | 83.7 | 86.0 | 78.6 | 67.4 | 72.5 |
| Yield of C$_2^=$ + C$_3^=$ (wt %) | 43.7 | 45.8 | 45.0 | 45.3 | 40.6 | 36.8 | 27.2 | 36.8 |
| Yield of C$_2^=$ (wt %) | 20.6 | 25.6 | 24.5 | 24.4 | 21.1 | 20.5 | 16.2 | 21.8 |
| Yield of C$_3^=$ (wt %) | 23.1 | 20.2 | 20.6 | 20.9 | 19.5 | 16.3 | 11.0 | 15.0 |
| Ratio of C$_2^=$/C$_3^=$ (wt %) | 0.89 | 0.80 | 0.80 | 0.86 | 0.90 | 0.80 | 0.70 | 0.70 |
| BTX (wt %) | 1.30 | 9.70 | 0.30 | 2.20 | 4.90 | 2.50 | 5.40 | 2.40 |

T = 650° C., W.H.S.V. = 4.7-5.2 h$^{-1}$, steam/naphtha ratio = 0.5-0.7, and atmospheric pressure, BTX = combined benzene, toluene, and xylenes.

Table 3.1 shows the results of the catalytic cracking of naphtha using exemplary zeolite catalysts as a function of Ti loading from the use of TiCl$_4$ during the preparation of the catalyst. The catalysts were prepared as described in Example 1 but with varied Ti loadings.

TABLE 3.1

TiCl$_4$ as Catalyst Precursor: Catalytic performance of Ti/HZSM-5 as a function of Ti loading

| Ti/HZSM-5 (Si/Al$_2$ = 27) | | | | | | | | |
|---|---|---|---|---|---|---|---|---|
| Ti loading (wt %) | 0.5 | 1.0 | 1.5 | 2.0 | 4.0 | 6.0 | 8.0 | 10.0 |
| Mass balance | 94 | 96 | 95 | 101 | 94 | 97 | 94 | 98 |
| Conversion, % | 83.0 | 84.9 | 82.9 | 83.7 | 86.1 | 84.1 | 82.5 | 83.7 |
| Yields, wt. % | | | | | | | | |
| C$_3^=$ + C$_2^=$ | 45.4 | 45.9 | 45.4 | 45.3 | 47.8 | 48.1 | 46.7 | 47.8 |
| C$_3^=$ | 23.1 | 24.5 | 24.5 | 24.4 | 25.5 | 26.1 | 25.9 | 26.5 |
| C$_2^=$ | 22.3 | 21.5 | 20.9 | 20.9 | 22.3 | 21.9 | 20.9 | 21.3 |
| C$_2^=$/C$_3^=$ | 1.00 | 0.88 | 0.85 | 0.86 | 0.88 | 0.84 | 0.81 | 0.80 |
| C$_4^=$ | 5.60 | 7.39 | 7.40 | 7.50 | 7.60 | 7.90 | 8.1 | 8.30 |
| BTX | 1.52 | 2.60 | 2.20 | 2.20 | 1.70 | 0.5 | 0.70 | 0.70 |
| C$_1$-C$_4$ alkane | 30.5 | 29.0 | 27.9 | 28.6 | 29.0 | 27.7 | 26.9 | 26.9 |
| Coke | 0.60 | 0.29 | 0.24 | 0.30 | 0.31 | 0.23 | 0.25 | 0.26 |
| H$_2$ | 1.20 | 1.12 | 1.09 | 1.10 | 1.10 | 1.00 | 0.90 | 0.90 |
| Selectivity, % | | | | | | | | |
| C$_3^=$ + C$_2^=$ | 54.8 | 54.0 | 55.0 | 54.0 | 56.0 | 57.0 | 57.0 | 57.0 |
| C$_3^=$ | 27.9 | 29.0 | 30.0 | 29.0 | 30.0 | 31.0 | 31.0 | 32.0 |
| C$_2^=$ | 26.9 | 25.0 | 25.0 | 25.0 | 26.0 | 26.0 | 25.0 | 25.0 |
| BTX | 1.83 | 3.1 | 2.60 | 2.70 | 1.90 | 0.60 | 0.90 | 0.80 |

T = 650° C., W.H.S.V. = 4.7-5.2 h$^{-1}$, steam/naphtha ratio = 0.5-0.7, and atmospheric pressure.

Table 3.2 shows the results of the catalytic cracking of naphtha using exemplary zeolite catalysts as a function of Ti loading from the use of Ti-methoxide during the preparation of the catalyst. The catalysts were prepared as described in Example 1 but with varied Ti loadings.

TABLE 3.2

Ti Methoxide as Catalyst Precursor: Catalytic performance of Ti/HZSM-5 as a function of Ti loading

| Ti loading (wt %) | 0.5 | 1.5 | 2.0 | 6.0 | 8.0 | 10.0 |
|---|---|---|---|---|---|---|
| Mass balance | 94 | 104 | 102.9 | 105 | 100 | 93 |
| Conversion, % | 76.1 | 80.8 | 77.1 | 78.6 | 78.9 | 79.5 |
| Yields, wt. % | | | | | | |
| C$_3^=$ + C$_2^=$ | 41.7 | 44.0 | 42.5 | 43.6 | 43.9 | 44.6 |
| C$_3^=$ | 24.9 | 24.8 | 24.3 | 25.4 | 25.0 | 26.3 |
| C$_2^=$ | 16.8 | 19.2 | 18.2 | 18.2 | 18.9 | 18.3 |
| C$_2^=$/C$_3^=$ | 0.67 | 0.77 | 0.75 | 0.71 | 0.75 | 0.70 |
| C$_4^=$ | 7.80 | 7.60 | 7.70 | 7.80 | 7.9 | 7.90 |
| BTX | 3.30 | 3.20 | 1.90 | 2.60 | 1.70 | 2.00 |
| C$_1$-C$_4$ alkane | 23.4 | 25.9 | 25.0 | 20.8 | 25.4 | 25.0 |
| H$_2$ | 1.10 | 1.10 | 0.11 | 1.20 | 0.90 | 1.30 |
| Selectivity, % | | | | | | |
| C$_3^=$ + C$_2^=$ | 55.0 | 55.0 | 55.0 | 56.0 | 56.0 | 56.0 |
| C$_3^=$ | 33.0 | 31.0 | 32.0 | 32.0 | 34.0 | 33.0 |
| C$_2^=$ | 22.0 | 24.0 | 24.0 | 23.0 | 23.0 | 23.0 |
| BTX | 4.30 | 4.00 | 2.50 | 3.30 | 2.30 | 2.60 |

T = 650° C., W.H.S.V. = 4.7-5.2 h$^{-1}$, steam/naphtha ratio = 0.5-0.7, and atmospheric pressure.

Table 3.3 shows the results of the catalytic cracking of naphtha using exemplary zeolite catalysts as a function of Ti loading from the use of Ti-ethoxide during the preparation of the catalyst. The catalysts were prepared as described in Example 1 but with varied Ti loadings.

TABLE 3.3

Ti Ethoxide As Catalyst Precursor: Catalytic performance of Ti/HZSM-5 as a function of Ti loading

| Ti loading (wt %) | 1.00 | 2.00 | 6.00 | 10.00 |
|---|---|---|---|---|
| Mass balance | 96.4 | 97.1 | 98.0 | 96.7 |
| Conversion, % | 73.0 | 68.4 | 70.4 | 69.0 |
| Yields, wt. % | | | | |
| $C_3^= + C_2^=$ | 41.9 | 39.4 | 41.5 | 41.1 |
| $C_3^=$ | 24.6 | 24.1 | 25.2 | 25.6 |
| $C_2^=$ | 17.4 | 15.4 | 16.3 | 15.5 |
| $C_2^=/C_3^=$ | 0.71 | 0.63 | 0.61 | 0.60 |
| $C_4^=$ | 7.30 | 7.30 | 7.40 | 7.50 |
| BTX | 0.1 | 0.8 | 0.9 | 0.1 |
| $C_1$-$C_4$ alkane | 23.6 | 20.8 | 20.6 | 20.2 |
| $H_2$ | 1.20 | 1.20 | 1.20 | 1.10 |
| Selectivity, % | | | | |
| $C_3^= + C_2^=$ | 58.0 | 58.0 | 59.0 | 60.0 |
| $C_3^=$ | 34.0 | 36.0 | 36.0 | 38.0 |
| $C_2^=$ | 24.0 | 22.0 | 23.0 | 22.0 |
| BTX | 0.10 | 1.20 | 1.20 | 0.10 |

T = 650° C., W.H.S.V. = 4.7-5.2 h$^{-1}$, steam/naphtha ratio = 0.5-0.7, and atmospheric pressure Table 3.4 shows the results of the catalytic cracking of naphtha using exemplary zeolite catalysts as a function of Ti loading from the use of Ti-isopropoxide during the preparation of the catalyst. The catalysts were prepared as described in Example 1 but with varied Ti loadings.

TABLE 3.4

Ti precursor is (Ti-isopropoxide): Catalytic performance of Ti/HZSM-5 as a function of Ti loading

| Ti loading (wt %) | 1.00 | 2.00 | 6.00 | 10.0 |
|---|---|---|---|---|
| Mass balance | 95.0 | 94.0 | 97.4 | 100 |
| Conversion, % | 74.3 | 72.8 | 72.5 | 71.3 |
| Yields, wt. % | | | | |
| $C_3^= + C_2^=$ | 42.6 | 42.7 | 42.5 | 42.3 |
| $C_3^=$ | 25.5 | 25.6 | 25.7 | 26.3 |
| $C_2^=$ | 17.1 | 17.1 | 16.8 | 16.0 |
| $C_2^=/C_3^=$ | 0.67 | 0.66 | 0.65 | 0.61 |
| $C_4^=$ | 7.80 | 7.60 | 7.70 | 7.70 |
| BTX | 1.20 | 0.40 | 0.80 | 0.80 |
| $C_1$-$C_4$ alkane | 22.8 | 22.1 | 21.6 | 20.5 |
| $H_2$ | 1.20 | 1.20 | 1.10 | 1.10 |
| Selectivity, % | | | | |
| $C_3^= + C_2^=$ | 57.0 | 59.0 | 59.0 | 60.0 |
| $C_3^=$ | 34.0 | 35.0 | 36.0 | 37.0 |
| $C_2^=$ | 23.0 | 23.0 | 23.0 | 22.0 |
| BTX | 1.70 | 0.60 | 1.20 | 1.10 |

T = 650° C., W.H.S.V. = 4.7-5.2 h$^{-1}$, steam/naphtha ratio = 0.5-0.7, and atmospheric pressure Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A catalyst comprising:
   a HZSM-5 type zeolite comprising at least one metal or ion thereof,
   wherein the at least one metal or ion thereof comprises titanium, and
   wherein the zeolite does not comprise molybdenum or phosphorus,
   wherein the metal originates from treating the zeolite with a metal precursor including at least one of titanium tetrachloride, titanium methoxide, titanium ethoxide, or titanium isopropoxide, and
   wherein the at least one metal or ion thereof further comprises barium, strontium, or tungsten.

2. The catalyst of claim 1, wherein the at least one metal or ion thereof further comprises barium.

3. The catalyst of claim 1, wherein the at least one metal or ion thereof further comprises strontium.

4. The catalyst of claim 1, wherein the at least one metal or ion thereof further comprises tungsten.

5. The catalyst of claim 1, wherein the zeolite catalyst comprises from 0.5 to 20 percent by weight of the at least one metal or ion thereof.

6. The catalyst of claim 1, wherein the zeolite has a Si/Al$_2$ ratio from 25 to 300.

7. The catalyst of claim 1, wherein the zeolite has a Si/Al$_2$ ratio of 27.

8. The catalyst of claim 1, wherein the metal originates from treating the zeolite with a metal precursor comprising titanium tetrachloride.

9. A method for the catalytic cracking of naphtha to olefins, comprising:
   a) providing a feed stream comprising naphtha and steam; and
   b) contacting the feed stream with a catalyst,
   thereby producing olefins; wherein the catalyst comprises a HZSM-5 type zeolite comprising at least one metal or ion thereof, wherein the at least one metal or ion thereof comprises titanium, and wherein the zeolite does not comprise molybdenum or phosphorus, wherein the metal originates from treating the zeolite with a metal precursor including at least one of titanium tetrachloride, titanium methoxide, titanium ethoxide, or titanium isopropoxide, and wherein the at least one metal or ion thereof further comprises barium, strontium, or tungsten.

10. The method of claim 9, wherein the zeolite comprises Bronsted acid sites.

11. The method of claim 9, wherein the zeolite catalyst has a Si/Al$_2$ ratio of 27.

12. The method of claim 9, wherein the naphtha feed stream comprises an alkane, an iso-alkane, naphthalene, and an aromatic, and has a boiling range from 35° C. to 100° C.

13. The method of claim 9, wherein the steam to naphtha mass ratio in the feed stream is from 0.1 to 4.0.

14. The method of claim 9, wherein the feed stream comprises diluents comprising nitrogen gas, methane, ethane, or a mixture thereof, and wherein the molar ratio of diluents to naphtha is maintained from 9 to 0.1.

15. The method of claim 9, wherein the contacting is carried out at a temperature from 500° C. to 750° C., and a pressure from 0.1 MPa to 3 MPa.

16. The method of claim 9, wherein the contacting is carried out at a weight hourly space velocity from 0.1 to 100 h$^{-1}$.

17. The method of claim 9, wherein the product stream comprises ethylene and propylene at an ethylene to propylene weight ratio of greater than 0.6.

18. The method of claim 9, wherein
a) the conversion of the naphtha feed is greater than 80%;
b) the yield of ethylene plus propylene is greater than 40% by weight; and
c) the ratio of ethylene to propylene is greater than 0.70.

19. A method for preparing the catalyst of claim 1, comprising
treating the HZSM-5 type zeolite with a solution comprising titanium tetrachloride and a solvent;
removing the solvent; and
calcining the treated zeolite to form the catalyst;
wherein the zeolite does not comprise molybdenum or phosphorus.

20. The method of claim 19,
wherein the zeolite catalyst comprises from 0.5 to 20 percent by weight of titanium,
wherein the zeolite has a $Si/Al_2$ ratio of 27.

* * * * *